May 20, 1969     J. L. CLARKE     3,445,127
UNIVERSAL FLANGE CONNECTOR
Filed May 26, 1967     Sheet 3 of 4
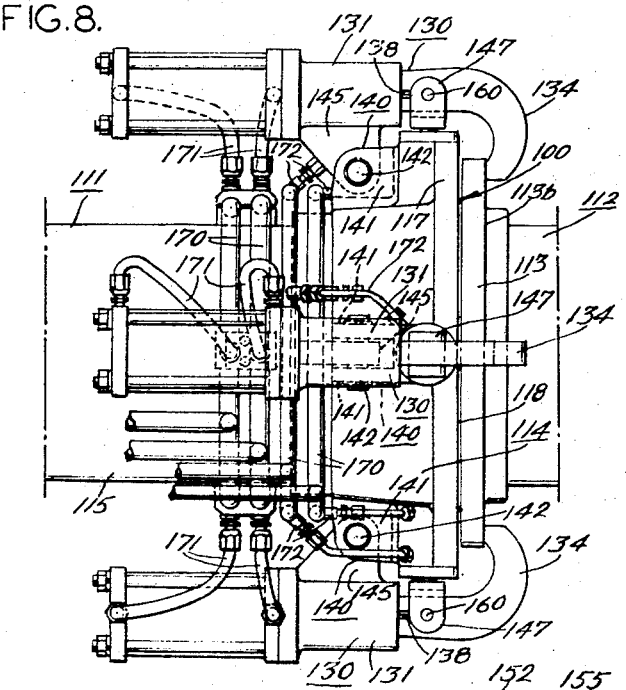
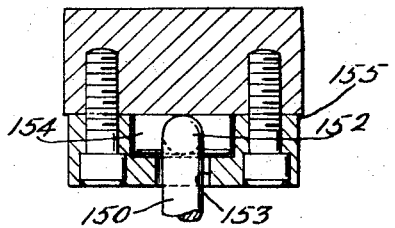
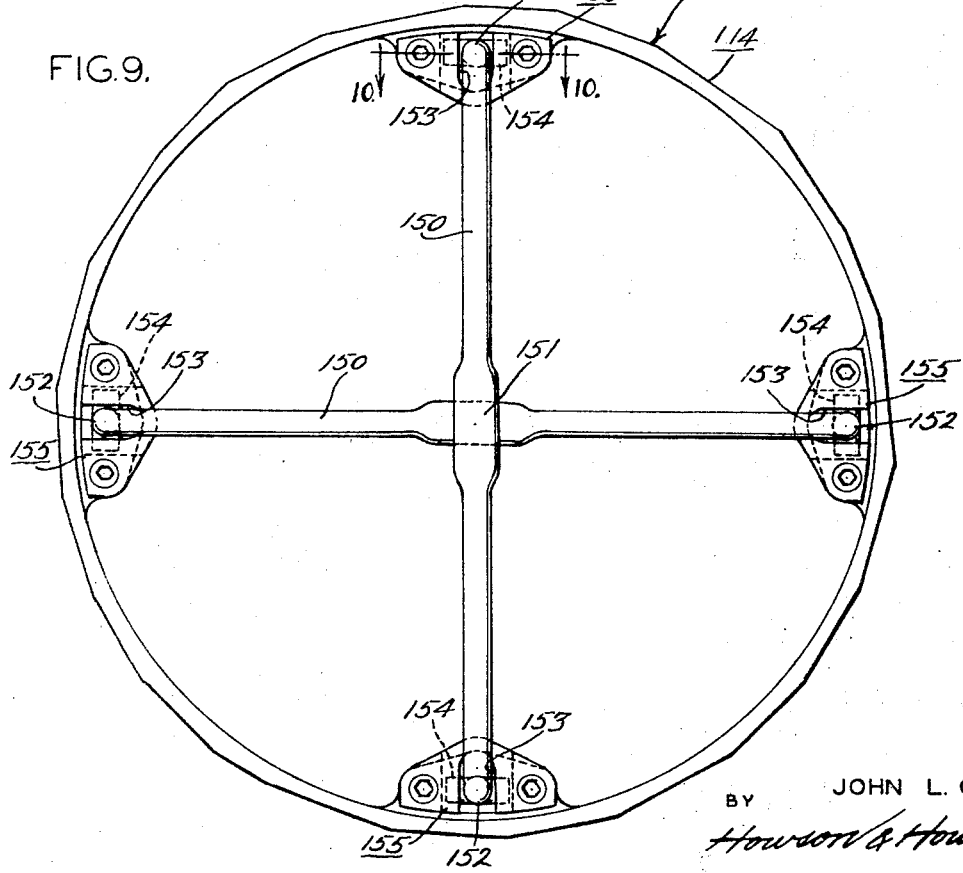
INVENTOR:
JOHN L. CLARKE
BY Howson & Howson
ATTYS.

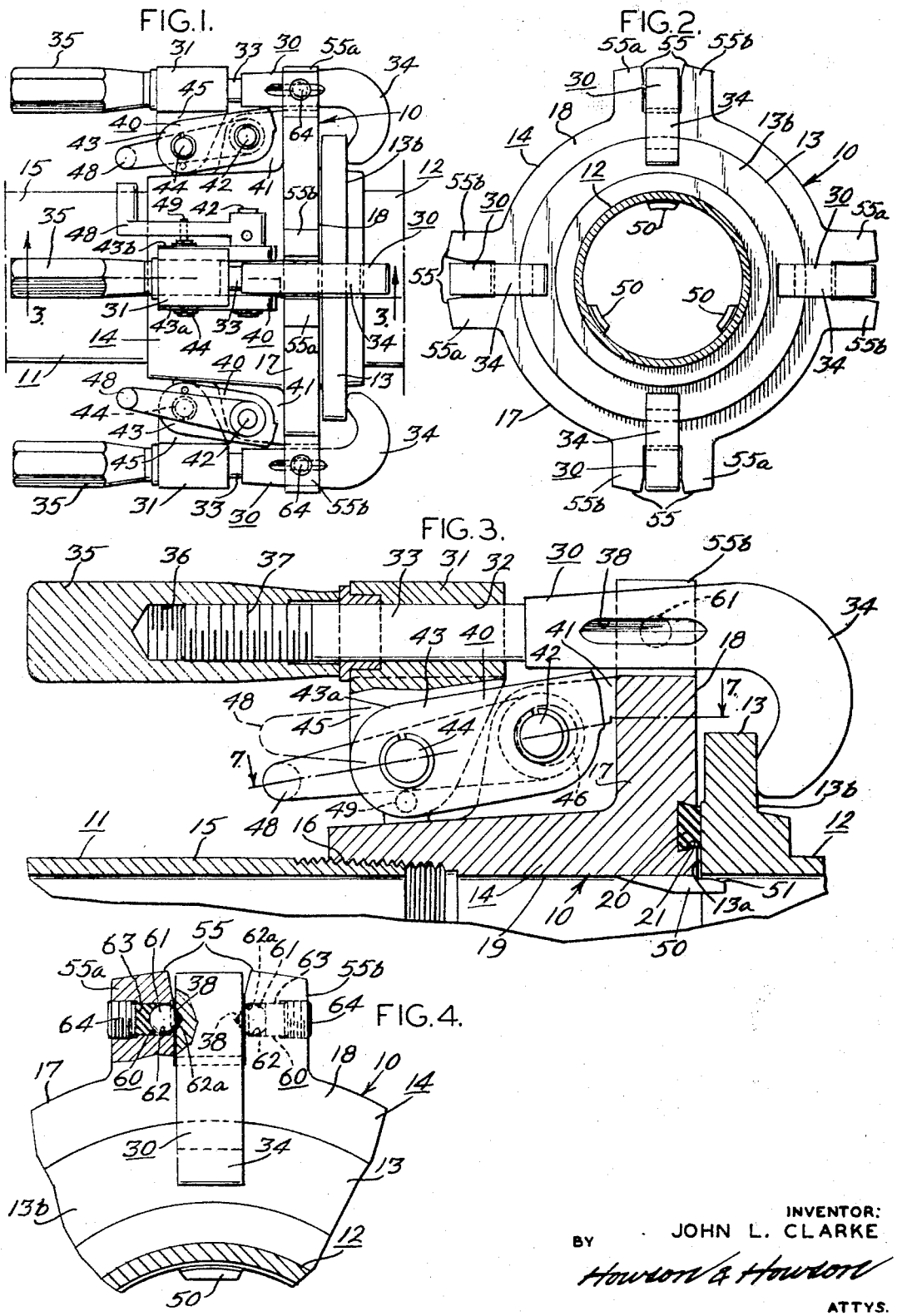

United States Patent Office 3,445,127
Patented May 20, 1969

3,445,127
UNIVERSAL FLANGE CONNECTOR
John L. Clarke, Annapolis, Md., assignor to Hydrasearch Co., Inc., Annapolis, Md., a corporation of Maryland
Filed May 26, 1967, Ser. No. 641,586
Int. Cl. F16l 23/00, 37/18
U.S. Cl. 285—88                10 Claims

ABSTRACT OF THE DISCLOSURE

A universal flange coupling permitting connection of adjacent or contiguous conduits having varying or the same diameter and/or thickness flanges even though the conduits have the same internal diameter. The coupling includes a nipple having circumferentially spaced clamps therearound which are pivotally mounted and movable both radially towards and away from the axis of the nipple and axially to engage or disengage varying diameter and thickness flanges which are to be mated with the flange of the nipple. In one embodiment an overcenter cam operated lock is provided for firmly engaging in sealin relation the faces of the mating flanges, while in another embodiment hydraulic pressure is utilized in order to cause and maintain the mating pressure. The disclosure also shows means for aligning and centering automatically one flange against the other.

Summary of the invention

The present invention relates to universal couplings and more particularly to quick-connect couplings for conduits including hoses, pipes and the like to facilitate the making of connections between contiguous liquid or gaseous carrying conduits.

More particularly the present invention relates to a universal coupling for connecting a first conduit to a second conduit having a flange. As will be more fully described hereinafter the coupling comprises a tubular nipple having a radially extending flange including a radially extending face. A sealing annulus on the flange face is used for effecting a seal between the face portion of the flange and the flange of the second conduit. At least one clamp, having a hooked end portion, extends axially of the nipple and projects forwardly of the face portion of the flange of the nipple, the hooked end of the clamp being adapted to engage the flange of the second conduit and maintain the flanges in mating relation. The clamp is mounted on the nipple by pivot means which permits rotation of the clamp about the pivot, the pivot means having an axis transverse to the longitudinal axis of the nipple. Also included is retaining means engagable with the clamp in order to inhibit free movement of the clamp about the pivot, while other means are provided for effecting longitudinal motion to at least the hooked end of the clamp.

Background of the invention

In marine facilities where ships of various nationalities deliver oil for storage and the like, very few of the ships have a standard flange on the terminal end or ends of the ship-to-shore hose(s) so that it may be easily and quickly coupled to the on-shore rig. For example, the flanges on the ends of a 6 inch hose may range in size from 15/16 inch to 1¾ inches in thickness, and from 11 to 13 inches in diameter. Of course with variations of this extent the bolt holes very seldom match up both as to radial and axial location as well as bolt diameter. Thus the operators or riggers are constantly faced with the problem of using make-shift methods including make-shift adaptors in order to make the necessary hose connection. There are, of course, many make-shift adaptors which are kept on hand by the terminal operators, who incidentally have to do all the work of connection and disconnecting as the ship's crew will not touch the hoses. Very seldom are there enough adaptors on hand or very seldom do the terminal operators have all the adaptors necessary.

Description of the invention

In view of the above it is a principal object of the present invention to provide a novel universal coupling for facilitating the coupling of contiguous conduits for the transfer of both liquid and gaseous media.

Still another object of the present invention is to provide a universal coupling which permits the coupling of contiguous conduits, regardless of the flange size, in a quick and easy manner.

Another object of the present invention is to provide a novel universal coupling which has built-in compensation for varying flange thickness and which will permit ease of coupling without the necessity of holding portions of the coupling while engaging and tightening to insure a good seal.

Still another object of the present invention is to provide means for aiding in the centering and aligning of the bores for contiguous flanges in order to permit axial alignment of the contiguous conduits.

Still a further object of the present invention is to provide another embodiment of a universal coupling having means for hydraulically assisting the connection between adjacent conduits.

Another object of the present invention is to provide an overcenter locking arrangement for maintaining and increasing the pressure grip of the coupling.

Other objects and a fuller understanding of the invention may be had by referring to the following specification and claims taken in conjunction with the accompanying drawings in which:

FIG. 1 is a fragmentary elevational view of one embodiment of the novel coupling of the present invention shown connecting contiguous conduits;

FIG. 2 is an end view of the coupling and conduits shown in FIG. 1 and as viewed from the right of FIG. 1;

FIG. 3 is an enlarged fragmentary sectional view taken along line 3—3 of FIG. 1 with a clamp of the coupling in a locked position;

FIG. 4 is an enlarged fragmentary view of a portion of the coupling illustrated in FIGS. 1–3;

FIG. 8 is a fragmentary elevational view of another embodiment of the novel coupling of the present invention connecting contiguous conduits;

FIG. 9 is an enlarged fragmentary transverse sectional view of a portion of the coupling illustrated in FIG. 8 with the flange of the conduit to which the coupling is connected removed for clarity;

FIG. 10 is an enlarged fragmentary sectional view taken along line 10—10 of FIG. 9;

Figure 11:
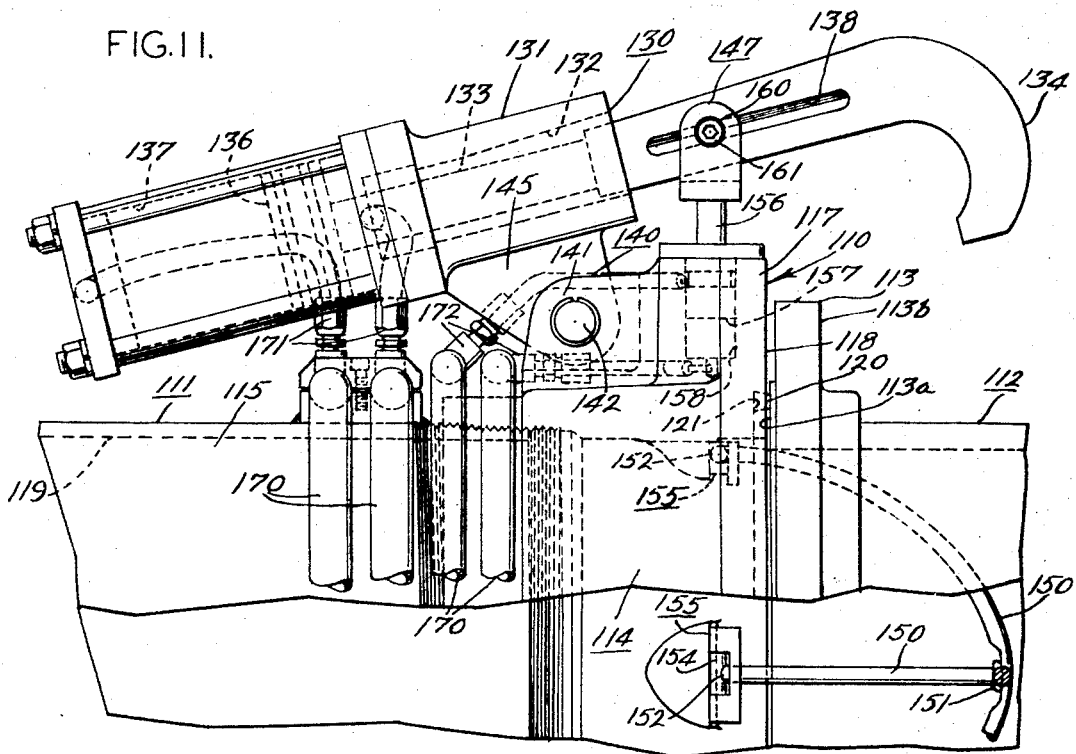
Figure 12:
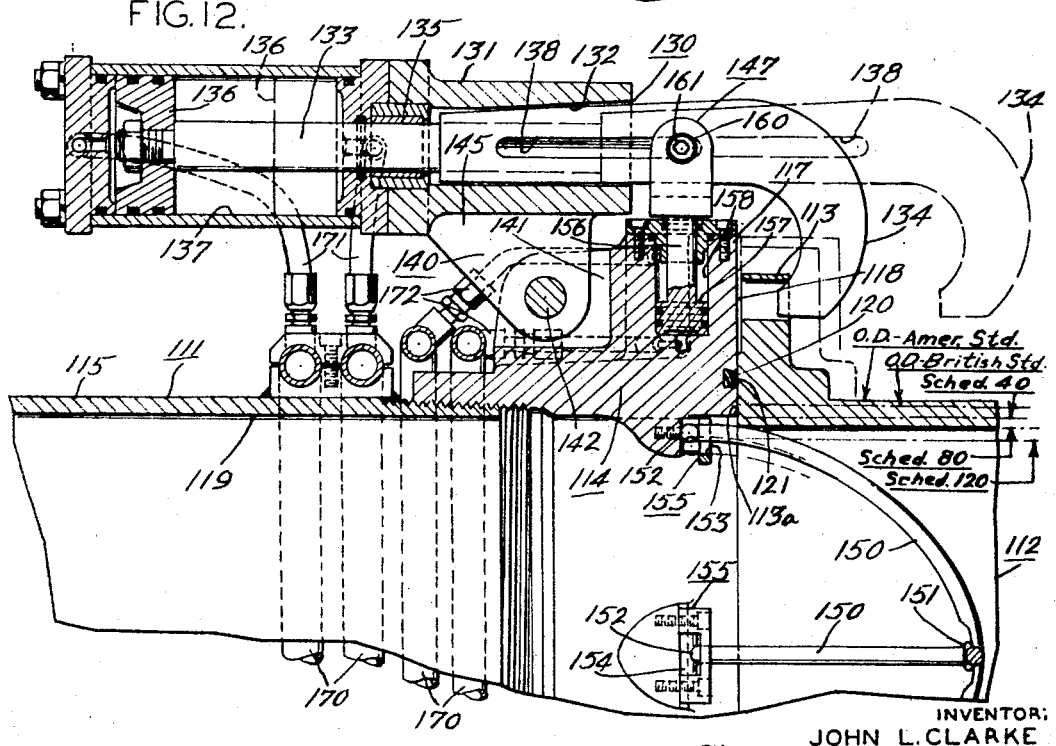

FIG. 11 is an enlarged side elevational view of a clamp of the present novel coupling, showing the clamp in an open position (as opposed to the closed position of FIG. 8) with a portion of the coupling in section to better illustrate the apparatus illustrated in FIGS. 9 and 10; and FIG. 12 is a fragmentary sectional view of the clamp shown in FIG. 11 except with the clamp in the closed position to effect a seal between the coupling and the flange of the contiguous conduit, with various lines illustrating the outer diameter of various flange and conduit sizes.

Referring now to the drawings, and especially FIGS. 1 and 2 thereof, a novel universal coupling 10 for connecting a first conduit 11 to a second conduit 12 having a flange 13 at one terminal end thereof, is shown therein. As illustrated best in FIGS. 1 and 3, the coupling comprises a tubular nipple 14 which is connected to a tubular extension 15 of the conduit 11 by threaded engagement as at 16. The forward end of the nipple 14 includes a radially extending flange 17 having a radial face portion 18 which extends outwardly from the terminal end of a bore 19 coextensive with the conduit 11.

In accordance with the invention, means are provided for effecting and maintaining a seal between the flange 13 and the flange 17 in order to permit the flow of a gaseous or liquid medium through the contiguous conduits. To this end, in order to effect a seal intermediate the face 18 of the flange 17 and the face 13a of the flange 13, a sealing annulus 20 is mounted in a groove 21 circumscribing the bore 19 on the face 18 of the flange 17. The sealing annulus may be composed of a resilient material such as rubber, Neoprene, Viton (synthetic polymer of Du Pont Corp. resistive to high temperature), Buna-N (the generic name for butadiene-styrene compound) or other material which will effect a good seal while being impervious to the type of liquid or gaseous medium flowing through the joined conduits.

In order to effect a mating relation between the sealing annulus 20 and the face 13a of the flange 13, and maintain this pressure in sealing face-to-face engagement, clamp means 30 are provided for connecting the nipple 14 to the flange 13, in the present instance a plurality of such clamp means 30 being provided about the periphery of the nipple 14 in circumferentially spaced relation (see FIG. 2). To this end, each clamp means 30 comprises a mounting 31 having an axially extending bore 32 therethrough for receiving a shaft 33 of the clamp means 30. As shown in FIG. 3, the clamp means extends axially of the nipple 14 and includes a hooked end 34 which projects forwardly of the face 18 of the flange 17 and is adapted to engage the reverse side 13b of the flange 13 of the second conduit 12. At the end opposite to the hooked end 34 of the shaft 33 is a handle 35 which is internally threaded as at 36 and rotatably secured to the mounting 31. The shaft 33, in a like manner, has threads 37 which cooperate with the threads 36 to effect sliding axial movement of at least the hooked end 34 of the clamp means, in the present instance the shaft and hooked end.

Figure 5:
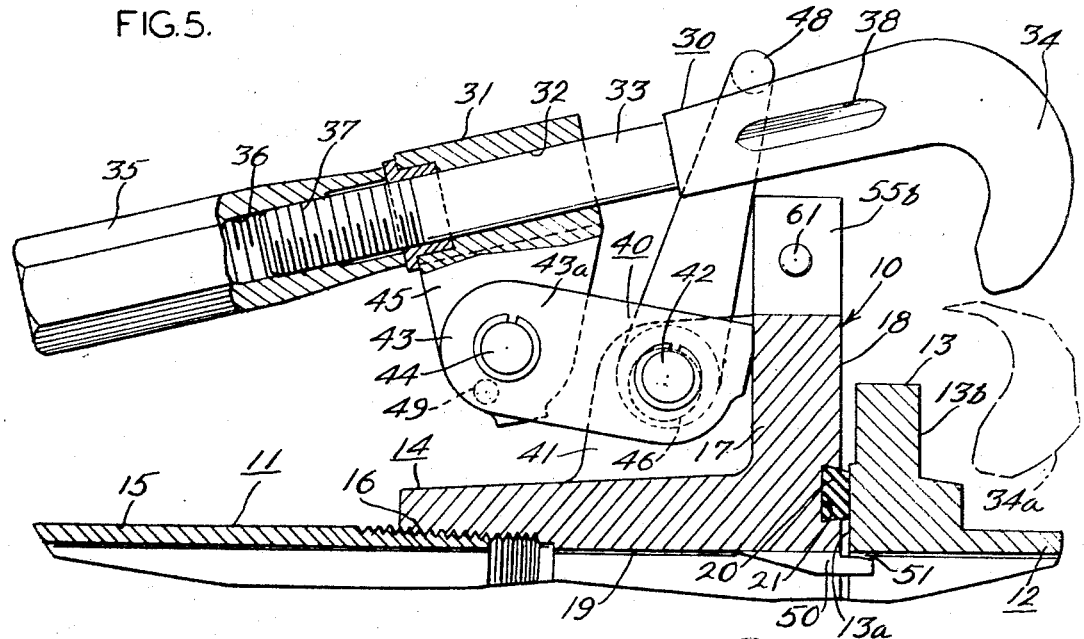
FIG. 5 is an enlarged fregmentary sectional view similar to FIG. 3 but showing the clamp of the coupling in the open position.
Figure 6:
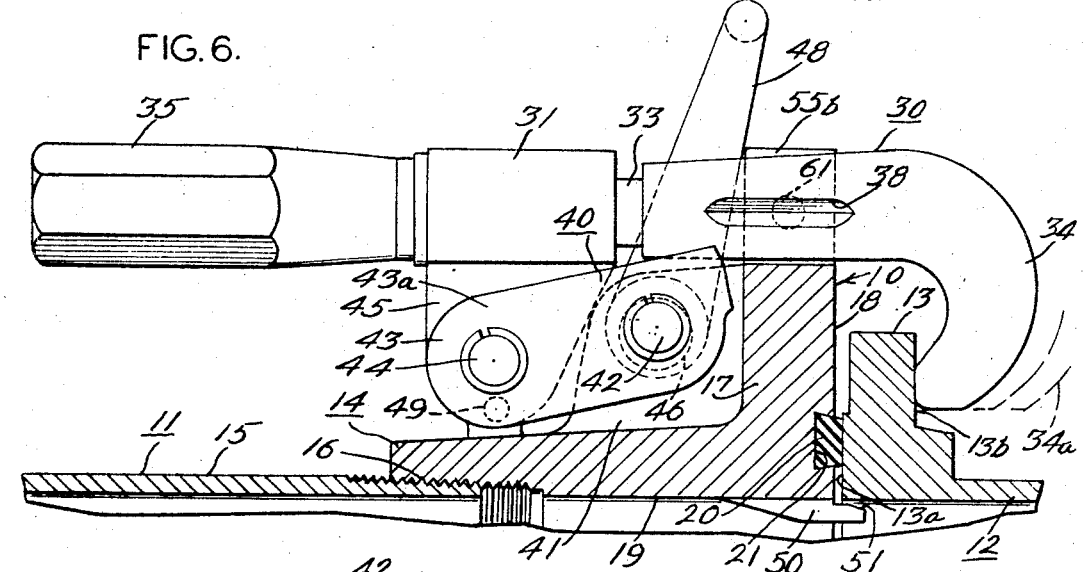
FIG. 6 is a fragmentary sectional view similar to FIG. 5 but showing the clamp of the coupling in an intermediate position.
Figure 7:
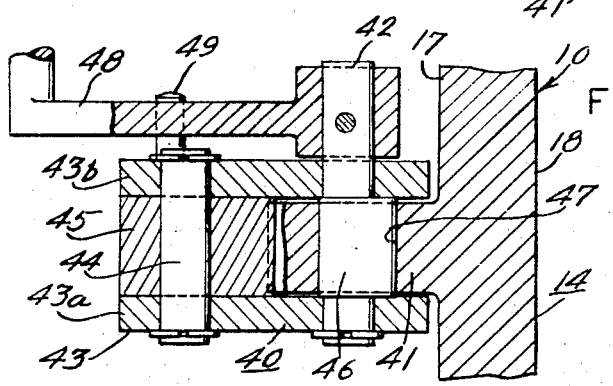
FIG. 7 is a fragmentary sectional view taken along line 7—7 of FIG. 3.

In order to permit radial movement of the clamping means, and especially the hooked end 34 towards and away from the radially extending flange 17, the mounting 31 for the clamp means is connected to pivot means 40 to permit rotation of the clamp and mounting about the pivot means, the pivot means having an axis transverse to the longitudinal axis of the nipple 14. To this end, and as best shown in FIGS. 5, 6 and 7, rearwardly of the flange 17, and associated with each of the clamp means 30, is a flange extension 41 having a first pivot pin 42 mounted therein and connected to at least one link 43, in the present instance a pair of links 43a and 43b positioned on opposite sides of the extension 41. As shown, extending through the links 43 is a second pivot pin 44 parallel to the pivot 42 and pivotably connecting an ear 45 which is connected to the mounting 31. For reasons which will become more evident hereinafter, the first pivot pin 42 is provided with an eccentric 46 and a camming surface 47 on the extension 41 so that upon rotation of the first pivot pin, and thus rotation of the eccentric 46, the links 43 will move generally axially of the nipple. In order to effect such rotation, the pivot pin 42 is connected to a locking handle 48.

As the coupling of the present invention may be somewhat heavy, as well as the conduit and flange connector on the adjacent and contiguous part, handling of such terminal ends is clumsy and awkward and oftentimes, as is easily imagined, it is difficult to obtain accurate alignment of the contiguous bores. In order to facilitate accurate alignment of the bores, alignment means are provided in the bore adjacent the face 18 of the nipple 14, and projecting therefrom to aid in centering and aligning the bore with the bore of the flange 13 to be connected thereto. To this end, the alignment means, in the present instance, and as best shown in FIGS. 2 and 3 includes an axially projecting alignment lug, in the present instance three such lugs 50 circumferentially spaced equidistant about the interior of the bore 19. As shown in FIG. 2, the lugs 50 preferably include an exterior tapered surface 51 which is easily engageable with the leading edge of the face 13a of the flange 13, so that upon bringing the flanges together the flange 13 rides up on the tapered edge 51 causing accurate alignment and mating of the one flange 13 with the other flange 17.

In order to inhibit inadvertent radial movement of the clamp means 30 about the pivot means 40, especially when initially coupling the flange 17 to the flange 13, retaining means are provided to impede such undesirable motion. To this end, and as best illustrated in FIGS. 2 and 4, circumferentially spaced about the flange 17 are radially extending bifurcations 55, the legs 55a and 55b of which are laterally spaced a distance sufficient to house a portion of the clamp means 30 and inhibit free movement of the clamp relative to the pivot. As illustrated the shaft 33 is provided with track means, in the present instance a slotted recess or groove 38 adapted to cooperate with catch means 60, when the clamp is housed intermediate the legs 55a and 55b of the bifurcations 55. As best shown in FIG. 4, the catch means comprises a ball 61 housed in a bore 62 having a socket-like retaining lip 62a at its inner end limiting the movement of the ball 61 towards the slotted recess 38. As shown, behind the ball 61 is biasing means 63 such as a rubber pad, the amount of bias being adjustable as by an adjustment screw 64.

In operation, all of the handles 35 are pressed downwardly until the clamp means are free of the retaining means, the locking lever 48 being in the raised position such as illustrated in FIG. 5. The flange 13 is then brought into mating relation with the flange 17, centering and alignment being effected by the lugs 50 engaging the interior bore of the conduit 12. The clamp means is then pushed downward about the first pivot so that the hooked end 34 reaches the dotted line position 34a shown in FIG. 5, the slotted recess 38 being engaged intermediate the legs 55a, 55b of the radial bifurcations 55. The handle 35 is then turned until the hooked end 34 engages against the exterior surface 13b of the flange 13. Thereafter the locking levers 48, which have been in the raised position as shown in FIGS. 5 and 6 are turned downwardly causing rotation of the eccentric 46 and causing the hooked end 34 to be pulled rearward even more tightly than was caused by rotation of the handle 35 and coactive engagement of the screw threads 36 and 37. As best shown in FIG. 3, the locking lever is pulled downward past the center or high spot of the eccentric 46 so that upon the locking lever 48 reaching a position below the line of contact of the hooked end 34, the eccentric causes locking action of the clamp means.

Although not absolutely necessary, depending upon the design of the nipple, a stop 49 is provided on the link 43b to prevent over rotation of the locking lever 48 relative to the pivot means.

In certain instances it is desirable to provide means for automatically clamping one flange onto another flange so that the time of connecting to an existing rig is more rapid. In such instances, the flange to be attached would be moved into registry with the coupling and the coupling would be actuated to automatically clamp the flange to be coupled thereto. To this end, and in accordance with another novel embodiment of the present invention, a hydraulically actuated universal coupling 110, for connecting a first conduit 111 to a second conduit 112, the second conduit having a flange 113 at one terminal end thereof, is shown in FIG. 8.

As best shown in FIGS. 8, 11 and 12, the novel coupling 110 comprises a tubular nipple 114 which is connected to a tubular extension 115 in much the manner as has heretofore been described relative to the embodiment of the coupling illustrated in FIG. 1. As illustrated, the forward end of the nipple 114 includes a radially extending flange 117 having a radial face portion 118 which extends outwardly away from the terminal end of a bore 119 coextensive with the conduit 111.

As best shown in FIGS. 11 and 12, and as has heretofore been explained, means are provided for effecting and maintaining a seal between the flanges 113 and 117, the sealing means comprising a sealing annulus 120 which is mounted in a groove 121 in the face 118 of the flange 117, and circumscribes the bore 119.

As illustrated in FIGS. 11 and 12, the coupling 110, like the coupling 10, also includes novel clamp means 130 in order to effect a mating relation between the sealing annulus 120 and the face 113a of the flange 113. As best shown in FIG. 8, a plurality of such clamp means 130 are provided about the periphery of the nipple 114 in circumferentially spaced relation.

In order to effect movement similar to that as has previously been described in clamping and maintaining a tight seal between the adjacent and contiguous conduits, the clamp means 130 includes a mounting 131 having an axially extending bore 132 therethrough for receiving a shaft 133. As illustrated in FIGS. 11 and 12, the clamp means extends axially of the nipple 114 and includes a hooked end 134 which projects forwardly of the face 118 of the flange 117 and is adapted to engage the reverse surface 113b of the flange 113 associated with the second conduit 112. In lieu of the handle arrangement, as heretofore described relative to the embodiment of FIG. 1, the shaft 133 passes through a sealing gland 135 and is connected to a hydraulically operated piston 136 housed in a chamber 137 for reciprocative movement.

As before, in order to allow radial movement of the clamping means 130, and especially the hooked end 134 towards and away from the radially extending flange 117, the mounting means 131 for the clamp means 130 is connected to pivot means 140 to permit rotation of the clamp 130 and mounting 131 about the pivot means 140, the pivot means having an axis transverse to the longitudinal axis of the nipple 114. As illustrated in FIGS. 8, 11 and 12, a flange extension 141 projects rearwardly from the flange 117 and includes a first pivot 142 which pivotably connects an ear 145 of the mounting 131.

In order to inhibit inadvertent or undesirable radial movement of the clamp means 130 about the pivot means 140, and similar to that which has previously been described with regard to the coupling 10, retaining means are provided to impede such undesirable motion. Thus in a manner similar to that as has heretofore been described, and as best shown in FIG. 8, circumferentially spaced about the flange 117 are radially extending bifurcations or yokes 147, the legs of which are laterally spaced a distance sufficient to house a portion of the clamp means 130 while inhibiting free movement of the clamp relative to the pivot means 140. As before, the shaft 133 is provided with track means, in the present instance a slotted recess or groove 138 adapted to cooperate with catch means 160 comprising, in the present instance, dog point set screws 161. The slotted recess 138 and the set screws 161 cooperate to prevent free movement of the clamp means 130 about the pivot 140 while permitting axial or longitudinal movement of the hooked end 134 of the clamp means.

As shown in FIGS. 11 and 12, means are provided for automatically effecting a raising or lowering of the retaining means so that the hooked end 134 of the clamp means 130 may be moved radially in order to give clearance for proper alignment of the flange 113 relative to the flange 117. To this end, the bifurcations or yokes 147 are preferably U-shaped providing a housing for the shaft 133 intermediate the legs of the U. Connected to the bifurcation or yoke is a shaft 156 having a piston 157 housed in a chamber 158 in the flange 117. The piston 157 is operable for reciprocative movement in order to effect radial reciprocation, as desired, of the retaining means.

In order to effect both axial reciprocation of at least the hooked end 134 of the clamp means 130, and radial reciprocation of the bifurcation or yoke 147, a hydraulic manifold 170 is provided for permitting hydraulic fluid to enter and be removed from the chambers 137 and 158 respectively upon actuation and as desired by the operator. As noted, hydraulic piping 171 connects the forward and after end of each of the chambers 137 associated with the clamping means 130, and hydraulic piping 172 connects the upper and lower ends of the chambers 158 associated with the retaining means, appropirate valving and controls (not shown) being operative remotely for effecting the desired opening and closing motions, which motions will be more fully described hereinafter.

Although the alignment means heretofore described relative to the novel universal coupling 10 may be used, it may be preferable to provide a less critical alignment means especially because of the increased weight of the universal coupling shown in FIG. 8. To this end, and as best illustrated in FIGS. 9 and 10, the alignment means may be of the self-centering type commonly referred to as of the "basket" variety. Typically the basket may comprise a pair of arcuate flexible crossed rods 150 which are connected as at 151 to afford four point contact for the mating flange. The terminal ends 152 of the rods 150 are retained in a slot 153 as by a cross bar 154, mounted in a fixture 155 adjacent the face 118 of the flange 117 and interiorly of the bore 119. If the rods 150 are composed of a flexible material, different schedule piping having differing wall thicknesses, as shown in FIG. 12, may be accommodately by flexure of the rod 150 and movement of the bar 154 and terminal ends 152 in the slots 153. The alignment of the mating flanges is somewhat easier with the alignment means shows in FIGS. 9–12, even through such alignment means are more expensive.

Operation of the coupling illustrated in FIGS. 8–12 is similar to the operation of the embodiment illustrated in FIGS. 1–7. Referring first to FIG. 11, the yoke or bifurcation 147 is elevated by the piston 157 being forced upwardly as by hydraulic fluid entering the lower hose of the hydraulic hoses 172. When the hooked end 134 is in the position shown in FIG. 11, the flange 113 is brought into contact with the sealing annulus 120 and alignment of the mating flange 113 is aided by the alignment means comprising the crossed rods 150. Thereafter hydraulic pressure is placed on the top of the piston 157 causing the bifurcation or yoke 147 to be lowered moving the hooked end 134 down into the dotted line position shown in FIG. 12. It should be recognized that the hook 134, when in this position, is extended to the right as shown by the dotted lines in FIG. 12. Thereafter hydraulic pressure is created on the right hand end or top of the piston 136, associated with the shaft 133, causing retraction or leftward movement of the hooked end 134 and clamping of the hooked end against the rear wall 113b of the flange 113. Although not shown, it should be recognized that conventional hydraulic fail-safes may be employed to maintain the clamps in the desired position.

Decoupling of the coupling 110 is effected in the reverse manner, i.e., by reversing hydraulic flow in the lines 171 and causing movement of the piston 136 to the right causing disengagement of the hooked end 134 from the reverse wall 113b of the flange 113. Thereafter, applying hydraulic pressure through the lower one of the lines 172 to the bottom of the piston 157 effects radial movement of the bifurcation 155 and raising of the clamp means 130 so that the flange 113 may be easily removed.

Thus the present invention provides apparatus for coupling contiguous conduits regardless of the flange diameter or thickness, in a quick and efficient manner.

Although the invention has been described with a certain degree of particularity, it is understood that the present disclosure has been made only by way of example and that numerous changes in the details of construction and the combination and arrangement of parts may be made.

I claim:

1. A universal coupling for connecting a first conduit to a second conduit having a flange; said coupling comprising a tubular nipple having a radially extending flange including a radially extending face; means connecting said tubular nipple to said first conduit; sealing means on said radial face to effect a seal between the face of said flange and the flange of said second conduit; a plurality of clamps carried by said tubular nipple and extending axially of said nipple beyond said face; each said clamp terminating in a hook portion at the end thereof which is beyond said face; each said hook portion adapted to engage the flange of said second conduit to couple said first and second conduits together; pivot means for each said clamp carried by said nipple, mounting means for each said clamp interconnecting each said clamp with said pivot means for pivotal movement of each said clamp about an axis transverse to the longitudinal axis of said nipple from a first position in which the hook portion of each said clamp is radially outward beyond the periphery of the flange of said second conduit to a second position in which each said hook portion overlies and engages the flange of said second conduit, first means to effect pivotal movement of each said clamp between said first and second positions, retaining means carried by said nipple engageable with each said clamp to inhibit movement of each said clamp from said second position; said member interconnecting each said clamp with said pivot means permitting longitudinal movement of each said clamp relative to said pivot means; and second means to effect longitudinal movement of said clamp when said clamps are in said second position in a direction substantially parallel to the axis of said nipple.

2. A universal coupling in accordance with claim 1 in which the mounting means for said clamp includes a member pivotally mounted on said pivot means and said clamp being carried by said member for movement longitudinally of said member.

3. The universal coupling in accordance with claim 2 wherein said clamp includes a shaft connected to said hook portion, said member having a bore therein for receiving said shaft, said shaft mounted with said bore for axial movement, and said second means to effect longitudinal movement of said clamp is connected to said shaft.

4. A universal coupling in accordance with claim 3 wherein said second means for effecting longitudinal motion of said shaft includes a hydraulic piston connected to said shaft.

5. A universal coupling in accordance with claim 1 wherein said retaining means includes a radial bifurcation, said clamp including a shaft portion having means positioned in said bifurcation, and catch means mounted in said bifurcation engagable with said means.

6. A universal coupling in accordance with claim 5 wherein said catch means includes resiliently biased means projecting inwardly of said bifurcation and said clamp shaft includes at least a track in said shaft portion engageable with said resiliently biased means.

7. A universal coupling in accordance with claim 6 wherein said track comprises a slotted recess and said resiliently biased means comprises a ball.

8. A universal coupling in accordance with claim 1 including means to effect movement of said retaining means in substantialy a radial direction relative to the axis of said nipple.

9. A universal coupling in accordance with claim 1 wherein said pivot means for said clamp includes a pivot pin mounted on said nipple connected to a link, said link having a second pivot pin connected to said clamp, an eccentric mounted intermediate said clamp and said nipple and means to rotate said eccentric, and means on said nipple engageable against said eccentric to cause axial movement of said clamp upon rotation of said eccentric.

10. A universal coupling in accordance with claim 9 wherein said eccentric is mounted on said first pivot pin and said means to rotate said eccentric comprises a locking handle operable to rotate said eccentric to a position past the line of contact of said hooked end portion to effect an overcenter locking.

References Cited

UNITED STATES PATENTS

| 366,541 | 7/1887 | Watson | 285—27 |
| 1,025,759 | 5/1912 | McCluskey | 285—27 |
| 2,370,354 | 2/1945 | Hurst | 285—27 X |
| 2,984,176 | 5/1961 | Sommer et al. | 24—263.4 X |

FOREIGN PATENTS

| 1,041,661 | 10/1958 | Germany. |
| 314,569 | 7/1929 | Great Britain. |
| 854,763 | 11/1960 | Great Britain. |

CARL W. TOMLIN, *Primary Examiner.*

W. L. SHEDD, *Asistant Examiner.*

U.S. Cl. X.R.

285—27, 310, 320, 311, 420